(12) United States Patent
Sayyah et al.

(10) Patent No.: US 11,639,988 B2
(45) Date of Patent: May 2, 2023

(54) PHOTONIC CIRCULATOR FOR A LIDAR DEVICE

(71) Applicant: GM GLOBAL TECHNOLOGY OPERATIONS LLC, Detroit, MI (US)

(72) Inventors: Keyvan Sayyah, Santa Monica, CA (US); Raymond Sarkissian, Studio City, CA (US); Biqin Huang, Rancho Palos Verdes, CA (US); Shuoqin Wang, Westlake, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 580 days.

(21) Appl. No.: 16/814,741

(22) Filed: Mar. 10, 2020

(65) Prior Publication Data

US 2021/0124048 A1 Apr. 29, 2021

Related U.S. Application Data

(60) Provisional application No. 62/927,254, filed on Oct. 29, 2019.

(51) Int. Cl.
*G01S 7/481* (2006.01)
*G01S 7/4911* (2020.01)
(Continued)

(52) U.S. Cl.
CPC .......... *G01S 7/4818* (2013.01); *G01S 7/4813* (2013.01); *G01S 7/4814* (2013.01); *G01S 7/4815* (2013.01);
(Continued)

(58) Field of Classification Search
None
See application file for complete search history.

(56) References Cited

U.S. PATENT DOCUMENTS 8,121,450 B2 2/2012 Webster et al.
2013/0209033 A1 8/2013 Luff et al.
(Continued)

OTHER PUBLICATIONS

Jacques, Samani, El-Fiky, Patel,Xing, Plant; Optimization of thermo-optic phase-shifter design and mitigation of thermal crosstalk on the SOI platform; Optics Express 10456; vol. 27, No. 8; Apr. 15, 2019.
(Continued)

*Primary Examiner* — Eileen M Adams
(74) *Attorney, Agent, or Firm* — Quinn IP Law (57) ABSTRACT

An integrated photonic circulator is described, an application of which may be deployed on a chip-scale light-detection and ranging (LiDAR) device. The photonic circulator includes a micro-ring resonator waveguide, a heating element, first and second bus waveguides, a magneto-optic substrate, a magneto-optic element, a magnetic ring disposed on a photonic substrate, and a silicon substrate. The first and second bus waveguides are coupled to the micro-ring resonator waveguide, and the micro-ring resonator waveguide is affixed onto a first side of the photonic substrate. The magneto-optic element and the magneto-optic substrate are arranged on the micro-ring resonator waveguide, the magnetic ring is affixed to the magneto-optic substrate, the heating element is affixed to the photonic substrate, the photonic substrate is affixed to the silicon substrate, and the magnetic ring is concentric with the micro-ring resonator.

19 Claims, 3 Drawing Sheets

(51) Int. Cl.
  *G01S 7/4912* (2020.01)
  *G01S 17/88* (2006.01)
  *G02B 6/12* (2006.01)
  *G02B 6/122* (2006.01)
  *G01S 17/10* (2020.01)
  *G02F 1/095* (2006.01)
  *B60R 11/00* (2006.01)
  *G02F 1/01* (2006.01)

(52) U.S. Cl.
  CPC .......... *G01S 7/4816* (2013.01); *G01S 7/4817* (2013.01); *G01S 7/4911* (2013.01); *G01S 7/4916* (2013.01); *G01S 17/10* (2013.01); *G01S 17/88* (2013.01); *G02B 6/12004* (2013.01); *G02B 6/1228* (2013.01); *G02F 1/0955* (2013.01); *B60R 11/00* (2013.01); *G02B 2006/1215* (2013.01); *G02B 2006/12061* (2013.01); *G02B 2006/12097* (2013.01); *G02B 2006/12121* (2013.01); *G02B 2006/12147* (2013.01); *G02F 1/0147* (2013.01)

(56) References Cited

U.S. PATENT DOCUMENTS

| | | | |
|---|---|---|---|
| 2017/0307375 A1* | 10/2017 | Bowers | G01C 19/66 |
| 2018/0120433 A1 | 5/2018 | Eichenholz et al. | |
| 2019/0018110 A1 | 1/2019 | Kremer et al. | |
| 2019/0018114 A1 | 1/2019 | Patterson et al. | |
| 2019/0018120 A1 | 1/2019 | Efimov et al. | |
| 2019/0018139 A1 | 1/2019 | Sayyah et al. | |
| 2019/0018198 A1 | 1/2019 | Sayyah et al. | |
| 2019/0049757 A1* | 2/2019 | Bowers | G02F 2/002 |
| 2019/0234850 A1* | 8/2019 | Singh | G01N 21/39 |
| 2019/0235053 A1 | 8/2019 | Spector | |
| 2019/0302268 A1 | 10/2019 | Singer et al. | |
| 2019/0302269 A1 | 10/2019 | Singer et al. | |
| 2019/0391406 A1 | 12/2019 | Chen | |
| 2020/0011994 A1 | 1/2020 | Thorpe et al. | |
| 2020/0049801 A1 | 2/2020 | Sayyah et al. | |
| 2020/0256956 A1* | 8/2020 | Luff | G01S 17/58 |

OTHER PUBLICATIONS

Sacher, Mikkelsen, Huang, Mak, Yong, Luo, Li, Dumais, Jiang, Goodwill, Bernier, Lo, Poon; Monolithically Integrated Multilayer Silicon Nitride-on-Silicon Waveguide Platforms for 3-D Photonic Circuits and Devices; IEEE vol. 106, No. 12; Dec. 2018.

Komljenovic, Bowers; Monolithically Integrated High-Q Rings for Narrow Linewidth Widely Tunable Lasers; IEEE vol. 51, No. 11; Nov. 2015.

\* cited by examiner

PHOTONIC CIRCULATOR FOR A LIDAR DEVICE

CROSS-REFERENCE TO RELATED APPLICATIONS

This application claims the benefit of U.S. Provisional Patent Application No. 62/927,254 filed on Oct. 29, 2019, the disclosure of which is hereby incorporated by reference.

INTRODUCTION

Light-detection and ranging (LiDAR) is an optical remote sensing technology that operates to acquire positional information of objects in a surrounding environment employing a light emitter and a light sensor. Operation of a LiDAR device includes illuminating objects in the surrounding environment using light emitted from a light emitter, detecting light scattered by the objects using a light sensor such as a photodiode, and determining range of the objects based on the scattered light. A LiDAR device may employ light in the form of a pulse-modulated, frequency-modulated, or phase-modulated laser to measure ranges and other parameters of selected objects.

Photonic circulators are commonly utilized in optical communication systems and optical measurement systems such as a LiDAR device. A photonic circulator is a multi-port input-output non-reciprocal optic device that allows optical signals to be transmitted only sequentially along a specified port, such that when an optical signal is input from a specified port, it can only be output from another specific port. This transmission characteristic enables the photonic circulator to be employed in two-way communication systems to separate the optical signals of forward transmission and reverse transmission in the same optical fiber, thereby achieving bidirectional communication in a single optical fiber.

Nonreciprocal photonic devices, including optical isolators and circulators, are employed to break the time-reversal symmetry of light propagation to provide optical isolation and circulation in a photonic system, which is used to stabilize the laser operation or simplify the optical system design. In fiber optical systems or integrated photonic systems, optical nonreciprocity is achieved by using magneto-optical (MO) materials, in which time-reversal symmetry is broken by applying a magnetic field across the MO material to achieve macroscopic spin and orbital alignment and nonreciprocal electric dipole transitions. In a discrete optical isolator device, the magnetic field is applied coaxially with the light propagation direction, which yields a nonreciprocal rotation of the polarization of linearly polarized light, namely the Faraday effect.

SUMMARY

An integrated photonic circulator is described, an application of which may be deployed on a chip-scale light-detection and ranging (LiDAR) device. The photonic circulator includes a micro-ring resonator waveguide, a heating element, first and second bus waveguides, a magneto-optic substrate, a magneto-optic element, a magnetic ring disposed on a photonic substrate, and a silicon substrate. The first and second bus waveguides are coupled to the micro-ring resonator waveguide, and the micro-ring resonator waveguide is affixed onto a first side of the photonic substrate. The magneto-optic element and the magneto-optic substrate are arranged on the micro-ring resonator waveguide, the magnetic ring is affixed to the magneto-optic substrate, the heating element is affixed to the photonic substrate, the photonic substrate is affixed to the silicon substrate, and the magnetic ring is concentric with the micro-ring resonator.

An aspect of the disclosure includes the heating element being affixed to a second side of the photonic substrate that is opposite to the first side of the photonic substrate.

Another aspect of the disclosure includes the heating element being deposited in a trench that is formed in the second side of the photonic substrate.

Another aspect of the disclosure includes the heating element being configured as an annular device that is arranged concentric to the micro-ring resonator waveguide.

Another aspect of the disclosure includes the heating element being operatively connected to a heating controller.

Another aspect of the disclosure includes the magneto-optic element being affixed to the micro-ring resonator waveguide, and the magneto-optic substrate being affixed to the magneto-optic element.

Another aspect of the disclosure includes the magneto-optic element being bonded to the micro-ring resonator waveguide.

Another aspect of the disclosure includes the magneto-optic element being deposited onto the micro-ring resonator waveguide.

Another aspect of the disclosure includes first and second bus waveguides including input and output ports.

Another aspect of the disclosure includes the magneto-optical element being fabricated from $(CeY)_3Fe_5O_{12}$.

Another aspect of the disclosure includes the magnetic ring being an electro-magnetic ring, and wherein the electro-magnetic ring is operatively connected to an electro-magnetic controller.

Another aspect of the disclosure includes the magnetic ring being a ring fabricated as a permanent magnet device.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of optical, mechanical and electrical hardware, sensors, controllers, application-specific integrated circuits (ASIC), combinatorial logic circuits, software, firmware, and/or other components that are arranged to provide the described functionality.

Figure 1:
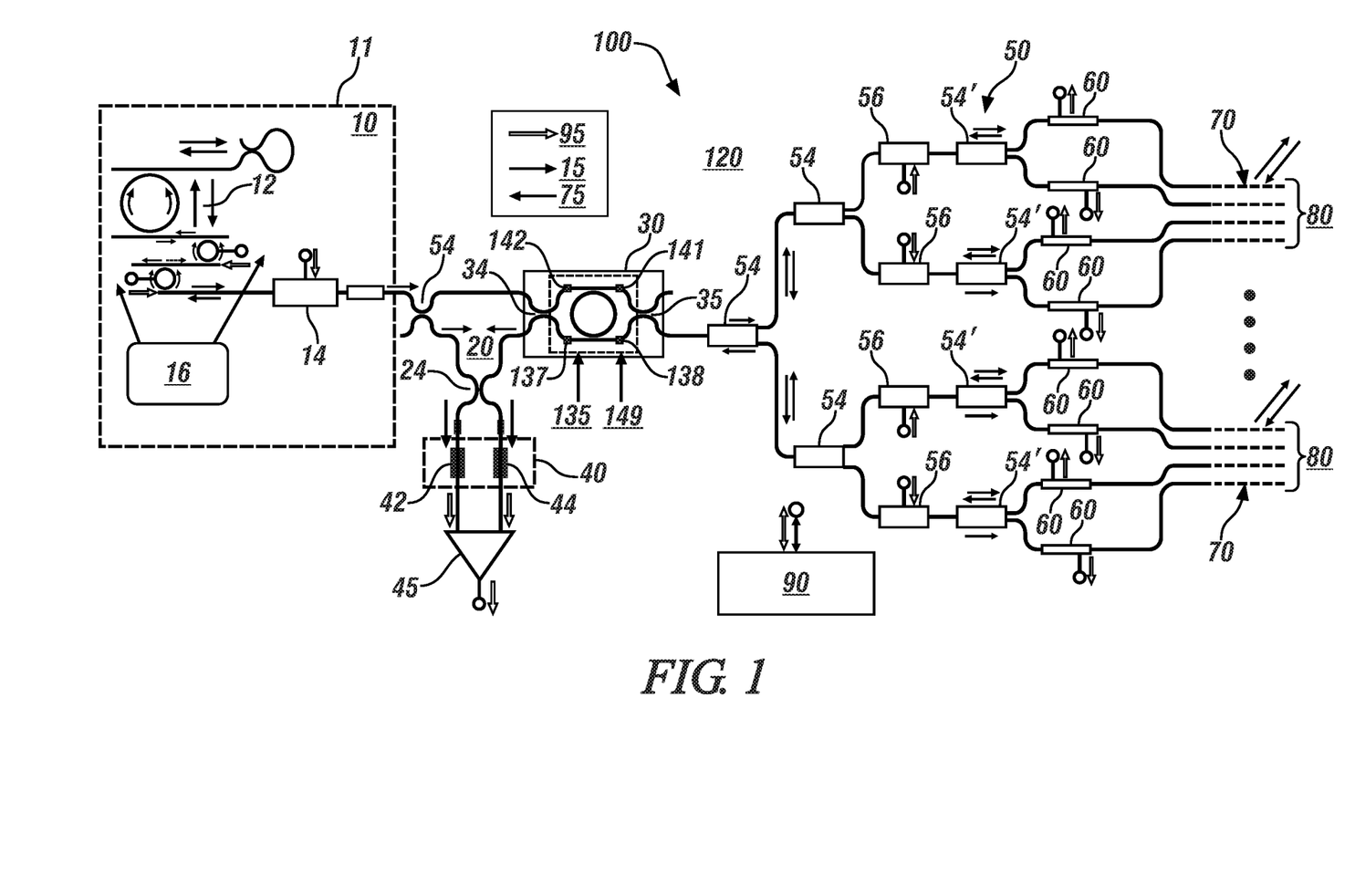
FIG. 1, schematically illustrates an embodiment of a light detection and ranging (LiDAR) device, in accordance with the disclosure.

Referring to the drawings, wherein like reference numerals correspond to like or similar components throughout the several Figures, FIG. 1, consistent with embodiments disclosed herein, schematically illustrates an embodiment of a light detection and ranging (LiDAR) device 100. The LiDAR device 100 described herein is configured as a chip-scale optical phased array based frequency-modulated continuous wave (FMCW) LiDAR device with features that include a single transmit and receive optical phase array (OPA) aperture enabled by the integration of a chip-scale photonic circulator. This configuration reduces the chip footprint as compared to other systems. The LiDAR device 100 includes an array of fully-integrated semiconductor optical amplifiers (SOA) that are distributed among the array elements resulting in a power-scalable LiDAR transmitter and receiver. The LiDAR device 100 also includes a widely tunable (~100 nm), fully-integrated, narrow linewidth master laser, which enables wide angle scanning in the off-chip direction parallel to the OPA antennas. In an embodiment of this architecture, a mixed Si and SiN integrated photonic platform is used enabling the co-integration of the narrow linewidth laser source together with active Si photonic components such as Ge-on-Si photodiodes. Such a configuration may enable a mm-size OPA with mm-long optical antennas that enable transmit beams with very low divergence (<0.1°) with no free-space optics. Such a configuration may also enable implementation of a pseudo-random OPA, which results in LiDAR transmit beams with no grating lobes, hence reducing the complexity of FMCW beat signal detection and interpretation, and a compact (<1 cm$^2$) LiDAR sensor that may be enabled by the full integration of the laser, photonic circulator and scanning mechanism in a single chip transmit/receive LiDAR aperture implementation.

Referring again to FIG. 1, one embodiment of the LiDAR device 100 is schematically illustrated, including a laser 10, a transmit optical splitter 20, a photonic circulator 30, a set of photodetectors 40, including photodetectors 42 and 44 in one embodiment, and an optical phased array 50. The laser 10, the transmit optical splitter 20, the photonic circulator 30, the set of photodetectors 40, and the optical phased array 50 are arranged as a chip-scale package on a single semiconductor substrate 120. The laser 10 generates a transmitted light beam 15 that is transmitted to an aperture 80 of the optical phased array 50 via the transmit optical splitter 20, the photonic circulator 30, and the optical phased array 50. The laser 10, the transmit optical splitter 20, the photonic circulator 30, the optical phased array 50, and the aperture 80 are interconnected via optical waveguides. A controller 90 is arranged to monitor and control various elements of the LiDAR device 100, with electrical signals employed for communication with the controller 90. Electrical signal communication between the controller 90 and the LiDAR device 100 is indicated by arrows 95.

The transmitted light beam 15 is transmitted to the set of photodetectors 40 via transmit optical splitter 20 via optical waveguides. The aperture 80 of the optical phased array 50 captures a second, received light beam 75 that is transmitted to the set of photodetectors 40 via the optical phased array 50 and the photonic circulator 30. The aperture 80 interconnects via the optical phased array 50 to the set of photodetectors 40 via optical waveguides.

The LiDAR device 100 is arranged as a chip-scale package. A chip-scale package (CSP) is an optical and electronic integrated circuit package that includes surface-mount technology, and whose surface area is not more than 1.2 times an original die area. There are many benefits associated with chip-scale packages. Size reduction of the package compared to traditional packages is enabled due to flip-chip mounting of the OPA electronic driver application specific integrated circuit (ASIC) chip to the OPA electrical contact ports, indicated by numeral 11. Other advantages associated with this chip-scale package approach include self-alignment characteristics and the lack of bent leads, features which further help in lowering the manufacturing time and steps.

The laser 10 is a widely tunable (~100 nm), fully-integrated, narrow linewidth master laser 10, and in one embodiment is configured as a scanning frequency modulated continuous wave (FMCW) LiDAR optical transmitter. The laser 10 includes a tunable high-Q laser resonator 12, a tunable laser controller 16, and a semiconductor optical gain chip 14, which feeds via a 1×2 splitter 54 into the photonic circulator 30 and the set of photodetectors 40 via the 2×2 coupler 24. The tunable high-Q laser resonator 12 includes, in one embodiment, a micro-ring or a waveguide grating-based high quality factor (Q) integrated optical resonator.

The set of photodetectors 40 includes photodetectors 42 and 44, which are arranged in a dual balanced photodetector configuration set and connected to a trans-impedance amplifier 45.

The trans-impedance amplifier 45 is in communication with the photodetectors 42 and 44, and generates an output signal that is communicated to the controller 90.

The photonic circulator 30 is configured as a fiber-optic component that separates optical signals that travel in opposite directions in an optical fiber, i.e., an optical waveguide. The photonic circulator 30 is a three- or four-port optical device designed such that light entering any port exits from the adjacent port. Fiber-optic circulators are used to separate optical signals that travel in opposite directions in an optical fiber, for example to achieve bi-directional transmission over a single fiber. The photonic circulator 30 is described with reference to FIGS. 2 and 3, and may include an integrated photonic circulator 30 that includes a micro-ring resonator-based photonic circulator 30 that is integrated with a magneto-optical material. The wavelength of the integrated photonic circulator 30 is tunable using either or both an electro-optic effect and a thermo-optic effect. The controller 90 provides operational control of the magneto-optical material via control signal 135, and provides operational control of the thermo-optic material via control signal 149.

The transmit optical splitter 20 directs the transmitted light beam 15 generated by the laser 10 to the optical phased array 50 via the photonic circulator 30, and directs the local oscillator light beam 15 generated by the laser 10 to the set of photodetectors 40.

The optical phased array 50 captures the second, received light beam 75 that is transmitted to the photonic circulator 30, and the photonic circulator 30 directs the received light beam 75 to the set of photodetectors 40. In one embodiment, the optical phased array 50 may be configured as an integrated two-dimensional scanning optical phased array (OPA) with a fully integrated photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, the light beams are steered into an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

The optical phased array 50 includes a plurality of 1×2 optical splitters 54 a plurality of semiconductor optical amplifiers 56, a plurality of phase shifters 60, a plurality of optical antennas 70, and the aperture 80, all of which are interconnected by optical waveguides. The aperture 80 is arranged as a single transmit and receive aperture. Scanning in the direction perpendicular to the antennas of the OPA are enabled by the phase control of the phase shifters 60, and in the direction parallel to the antennas are enables via wavelength control of the tunable laser 10.

The optical phase array 50 is configured as follows in this embodiment. A first of the 1×2 optical splitters 54 interconnects with the photonic circulator 30, and is connected in series with a pair of the 1×2 optical splitters 54 and arranged in a cascaded configuration of N branches. The outputs of the pairs of a number of the 1×2 optical splitters 54 are each connected to one of the semiconductor optical amplifiers 56, which are connected to a second set of the 1×2 optical splitters 54', each which feeds into one of a plurality of phase shifters 60, which lead into respective optical antennas 70. The semiconductor optical amplifiers 56 and the phase shifters 60 communicate with and are controlled by the controller 90. It should be noted that is some embodiments, the semiconductor optical amplifiers 56 are also placed in the higher order splits of the optical phased array in order to produce a higher transmit optical power level.

The plurality of optical antennas 70 are mm-long optical antennas that include grating couplers with uniform near-field emission patterns. Each of the plurality of optical antennas 70 operates as a transmit antenna and as a receive antenna.

The semiconductor optical amplifiers (SOAs) 56 of the optical phased array 50 are arranged to generate a power-scalable optical phased array. The SOAs 56 of the optical phased array 50 are controllable to vary signal intensity of the transmitted light beam 15 that is generated by the laser 10. The SOAs 56 of the optical phased array 50 are controllable to vary signal intensity of the received light beam 75 as well.

The plurality of optical antennas 70 of the optical phased array 50 are fed coherent signals having intensities that vary based upon the SOAs 56.

The laser 10, the transmit optical splitter 20, the photonic circulator 30, the set of photodetectors 40, and the optical phased array 50 are arranged on a single semiconductor substrate. This includes the laser 10, the transmit optical splitter 20, the photonic circulator 30, the set of photodetectors 40, and the optical phased array 50 being arranged on a silicon integrated photonic platform that is fabricated from mixed silicon and silicon nitride in one embodiment. A feedback circuit provides for the tunable laser wavelength control and stabilization.

Figure 2:
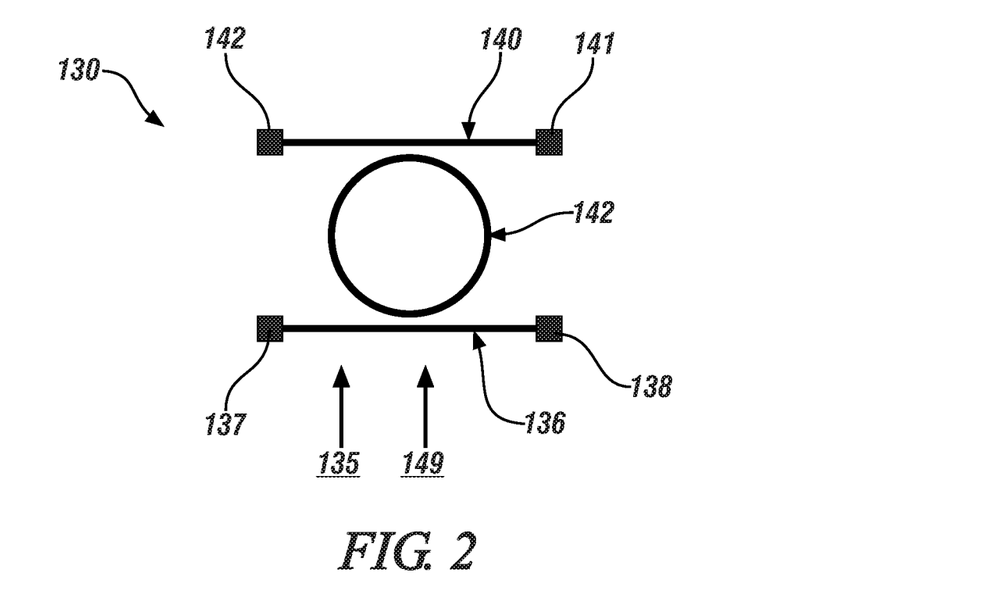
FIG. 2 schematically illustrates a top view perspective of an embodiment of a photonic circulator that is configured as a fiber-optic component that separates optical signals that travel in opposite directions in an optical waveguide, in accordance with the disclosure.
Figure 3:
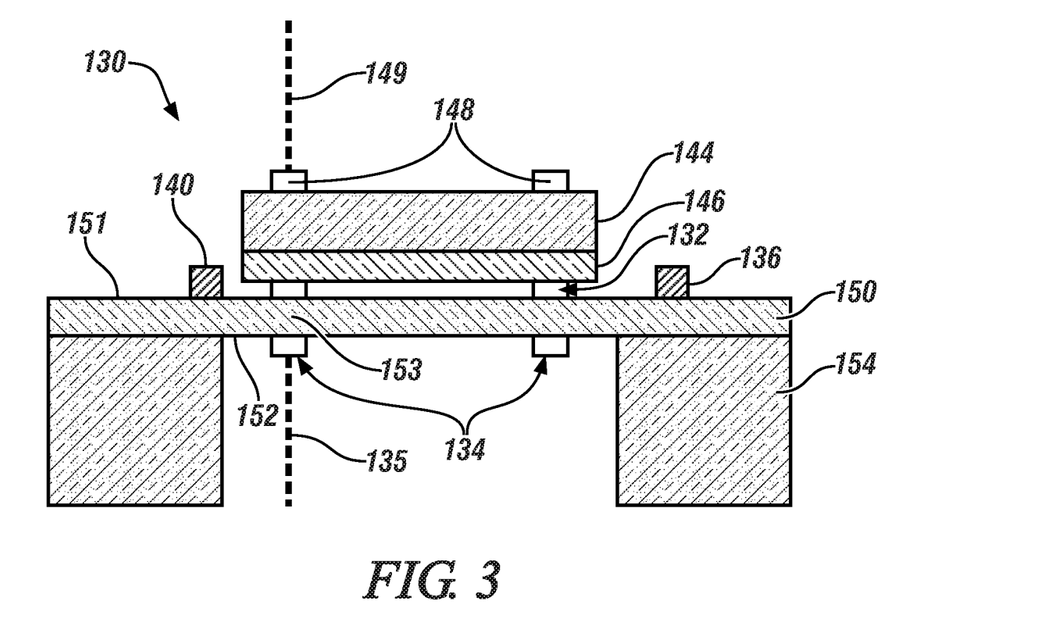
FIG. 3 schematically illustrates a cutaway end view of an embodiment of a photonic circulator, in accordance with the disclosure.

FIGS. 2 and 3 schematically illustrate an integrated photonic circulator 130 for a chip-scale LiDAR device 100, an embodiment of which is illustrated and described with reference to FIG. 1, and is configured as a fiber-optic component that separates optical signals that travel in opposite directions in an optical fiber, i.e., an optical waveguide. The photonic circulator 130 is implemented on a silicon substrate 154, and incorporates a micro-ring resonator waveguide 132 that is arranged on a photonic substrate 150.

The photonic substrate 130 includes a magneto-optic layer that is composed of a magneto-optic substrate 144 and a magneto-optic element 146, which may be fabricated from magneto-optic material. The magneto-optic material may be a magneto-optical garnet such as CeYIG, which may be in the form of $(CeY)_3Fe_5O_{12}$.

The photonic circulator 130 includes a first waveguide 136 including a first port 137 and a second port 138, and a second waveguide 140 including a third port 141 and a fourth port 142, all of which are arranged on or otherwise disposed on the silicon substrate 120. The first and second waveguides 136, 140 are routed in parallel through each of the first and second directional couplers 34, 35 (shown with reference to FIG. 1).

The elements of the photonic circulator 130 are arranged such that light coupled to the first port 137 appears in the second port 138, while the light coupled to the third port 141 appears in the fourth port 142 with minimal leakage and cross-port coupling.

The first and second directional couplers 34, 35 are configured as 2×2 couplers in one embodiment.

The integrated photonic circulator 130 includes a micro-ring resonator waveguide 132, a heating element 134, the first and second bus waveguides 136, 140, a magneto-optic substrate 144, a magneto-optic element 146, and a magnetic ring 148 disposed on a photonic substrate 150, and the silicon substrate 154. The first and second bus waveguides 136, 140 are coupled to the micro-ring resonator waveguide 132, and the micro-ring resonator waveguide 132 is affixed onto a first side 151 of the photonic substrate 150. The magneto-optic element 146 and the magneto-optic substrate 144 are arranged on the micro-ring resonator waveguide 132. The magnetic ring 148 is affixed to the magneto-optic substrate 144, the heating element 134 is affixed by bonding or deposition onto the photonic substrate 150, and the photonic substrate 150 is affixed to the silicon substrate 154. The magnetic ring 148 is concentric with the micro-ring resonator waveguide 132.

The heating element 134 being affixed to the photonic substrate 150 includes the heating element 134 being affixed to a second side 152 of the photonic substrate 150, which is opposite to the first side 151 of the photonic substrate 150. In one embodiment, the heating element 134 is deposited in a trench 153 that is formed in the second side 152 of the photonic substrate 150. The heating element 134 is configured as an annular device that is arranged concentric to the micro-ring resonator waveguide 132.

The magnetic ring is an electro-magnetic ring 148 in one embodiment, which is operatively connected to an electro-magnetic controller that may be integrated into the controller 90. The heating element 134 is operatively connected to a heating controller, which may be integrated into the controller 90. The controller 90 provides operational control of the magneto-optical material, i.e., the electro-magnetic ring 148 via control signal 135, and provides operational control of the thermo-optic material heating element 134 via control signal 149.

The magneto-optic element 146 and the magneto-optic substrate 144 may be arranged on the micro-ring resonator waveguide 132 by the magneto-optic element 146 being affixed to the micro-ring resonator waveguide 132, and the magneto-optic substrate 144 being affixed to the magneto-optic element 146. In one embodiment, the magneto-optic element 146 is affixed to the micro-ring resonator waveguide 132 by being bonded to the micro-ring resonator waveguide 132. In one embodiment, the magneto-optic element 146 is affixed to the micro-ring resonator waveguide 132 by being deposited onto the micro-ring resonator waveguide 132.

The CeYIG material enables high device performance, providing high transparency and high saturation Faraday rotation at telecommunication wavelengths (1550 nm and 1310 nm). Example requirements for the photonic circulator include a high isolation ratio (>20 dB), low insertion loss (<1 dB), broadband operation (several tens of nm), and temperature stability between −45 C and 85 C.

The arrangement of the photonic circulator 130 provides independent control of the heater and electromagnet electrical currents. Thus, tuning of the resonant wavelength of the micro-ring resonator is independent of the magnetization level of the magneto-optical material. This configuration generates nonreciprocity that is required for a photonic circulator. The formation of the heater in close proximity to the micro-ring resonator when placed on its backside through the trench serves to minimizes power dissipation and time constant required to reach a desired temperature and resonant wavelength.

Figure 4:
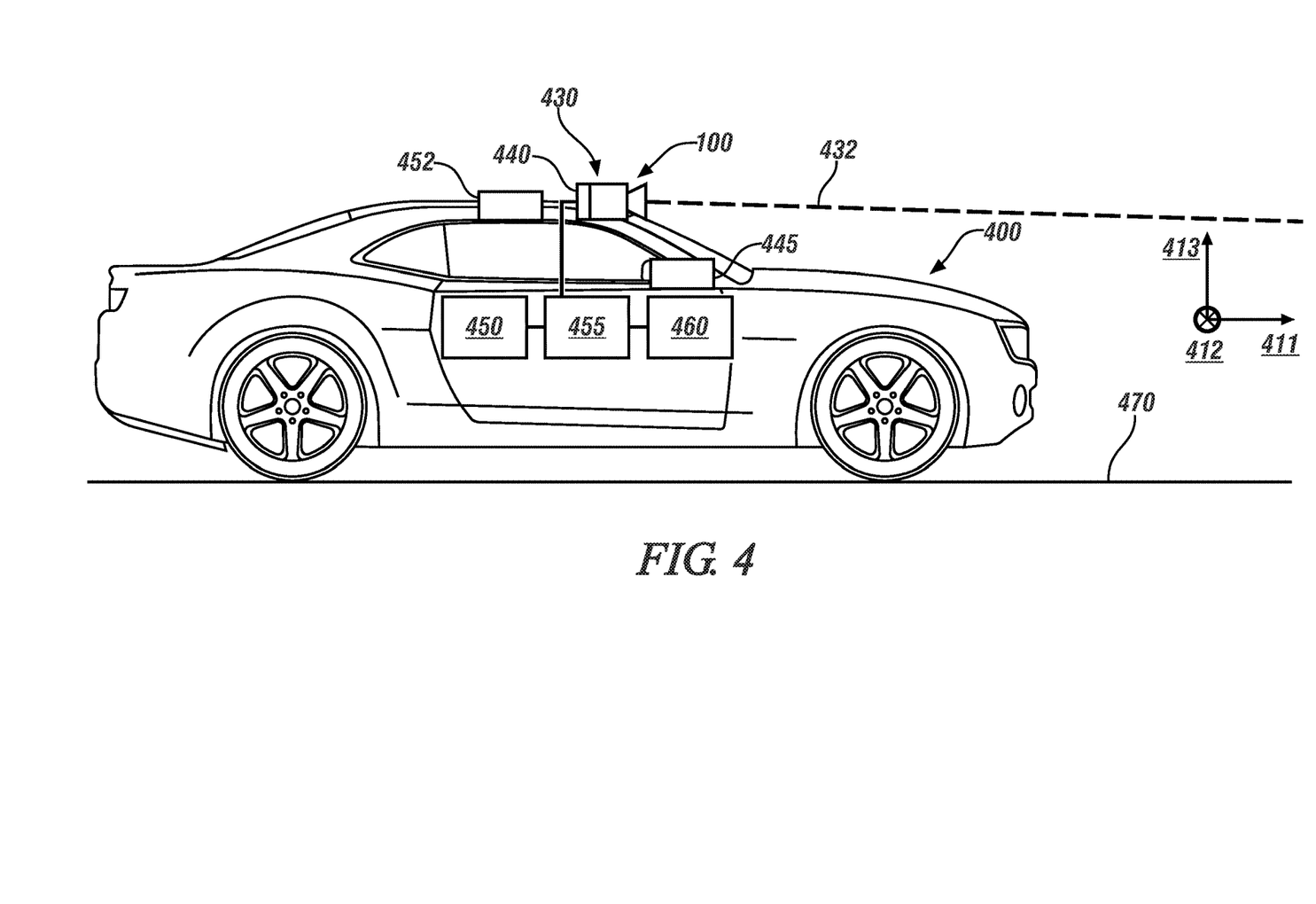
FIG. 4 schematically illustrates an embodiment of a LiDAR device, wherein the LiDAR sensor is an element of a spatial monitoring system that is disposed on a vehicle to monitor a field of view, in accordance with the disclosure.

FIG. 4 schematically illustrates a vehicle 400 that employs a LiDAR system 430 that includes either an embodiment of the LiDAR device 100 that is described with reference to FIG. 1. In one embodiment, and as described herein, the LiDAR system 430 is an element of a spatial monitoring system 440 including a spatial monitoring controller 455 that is disposed on the vehicle 400. The concepts described herein may be employed on various systems that may benefit from information determined from an embodiment of the LiDAR system 430.

A side-view of the vehicle 400 is shown, which is disposed on and able to traverse a travel surface 470 such as a paved road surface. The vehicle 400 and the travel surface 470 define a three-dimensional coordinate system including a longitudinal axis 411, a lateral axis 412 and an attitudinal axis 413. The longitudinal axis 411 is defined as being equivalent to a direction of travel of the vehicle 400 on the travel surface 470. The lateral axis 412 is defined as being equivalent to orthogonal to the direction of travel of the vehicle 400 on the travel surface 470. The attitudinal axis 413 is defined as being orthogonal to a plane defined by the longitudinal axis 411 and the lateral axis 412, i.e., as projecting perpendicular to the travel surface 470.

The LiDAR system 430 is disposed on the vehicle 400 to monitor a viewable region 432 that is proximal to the vehicle 400. In one embodiment, the viewable region 432 is forward of the vehicle 400. The vehicle 400 may also include a vehicle controller 450, a global navigation satellite system (GNSS) sensor 452, a human/machine interface (HMI) device 445. The LiDAR system 430 employs a pulsed and reflected laser beam to measure range or distance to an object. When employed in combination with information from the GNSS sensor 452, the spatial monitoring controller 455 is able to determine geospatial locations of objects that are in the viewable region 432 of the vehicle 400.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc., all of which are illustrated by element 460. The vehicle 400 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The spatial monitoring system 440 may include other spatial sensors and systems that are arranged to monitor the viewable region 432 forward of the vehicle 400 include, e.g., a surround-view camera, a forward-view camera, and a radar sensor, which may be employed to supplement or complement spatial information that is generated by the LiDAR system 430. Each of the spatial sensors is disposed on-vehicle to monitor all or a portion of the viewable region 432 to detect proximate remote objects such as road features, lane markers, buildings, pedestrians, road signs, traffic control lights and signs, other vehicles, and geographic features that are proximal to the vehicle 400. The spatial monitoring controller 455 generates digital representations of the viewable region 432 based upon data inputs from the spatial sensors. The spatial monitoring controller 455 can evaluate inputs from the spatial sensors to determine a linear range, relative speed, and trajectory of the vehicle 400 in view of each proximate remote object. The spatial sensors can be located at various locations on the vehicle 400, including the front corners, rear corners, rear sides and mid-sides. The spatial sensors can include a front radar sensor and a camera in one embodiment, although the disclosure is not so limited. Placement of the spatial sensors permits the spatial monitoring controller 455 to monitor traffic flow including proximate vehicles, intersections, lane markers, and other objects around the vehicle 400. Data generated by the spatial monitoring controller 455 may be employed by a lane marker detection processor (not shown) to estimate the roadway. As employed herein, the terms "proximate", "proximal" and related terms refer to stationary and mobile objects that are in the vicinity of the vehicle 400 such that they are discernible by one or more of the spatial sensors connected to the spatial monitoring controller 455 including the LiDAR system 430.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc. The vehicle 400 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An integrated photonic circulator for a chip-scale LiDAR device, comprising:
    a micro-ring resonator waveguide, a heating element, first and second bus waveguides, a magneto-optic substrate, a magneto-optic element, a magnetic ring disposed on a photonic substrate, and a silicon substrate;
    wherein the first and second bus waveguides are coupled to the micro-ring resonator waveguide;
    wherein the micro-ring resonator waveguide is affixed onto a first side of the photonic substrate of the magnetic ring;
    wherein the magneto-optic element and the magneto-optic substrate are arranged on the micro-ring resonator waveguide;
    wherein the magnetic ring is affixed to the magneto-optic substrate;
    wherein the heating element is affixed to the photonic substrate on a second side of the photonic substrate that is opposite to the first side of the photonic substrate;
    wherein the photonic substrate is affixed to the silicon substrate; and
    wherein the magnetic ring is concentric with the micro-ring resonator.

2. The integrated photonic circulator of claim 1, wherein the heating element being affixed to the second side of the photonic substrate that is opposite to the first side of the photonic substrate comprises the heating element being deposited in a trench that is formed in the second side of the photonic substrate.

3. The integrated photonic circulator of claim 1, wherein the heating element is configured as an annular device that is arranged concentric to the micro-ring resonator waveguide.

4. The integrated photonic circulator of claim 1, wherein the heating element is operatively connected to a heating controller.

5. The integrated photonic circulator of claim 1, wherein the magneto-optic element and the magneto-optic substrate being arranged on the micro-ring resonator waveguide comprises the magneto-optic element being affixed to the micro-ring resonator waveguide, and the magneto-optic substrate being affixed to the magneto-optic element.

6. The integrated photonic circulator of claim 5, wherein the magneto-optic element being affixed to the micro-ring resonator waveguide comprises the magneto-optic element being bonded to the micro-ring resonator waveguide.

7. The integrated photonic circulator of claim 5, wherein the magneto-optic element being affixed to the micro-ring resonator waveguide comprises the magneto-optic element being deposited onto the micro-ring resonator waveguide.

8. The integrated photonic circulator of claim 1, wherein the first and second bus waveguides include input and output ports.

9. The integrated photonic circulator of claim 1, wherein the magneto-optic element and the magneto-optic substrate are fabricated from a magneto-optical garnet composed as $(CeY)_3Fe_5O_{12}$.

10. The integrated photonic circulator of claim 1, wherein the magnetic ring comprises an electro-magnetic ring, and wherein the electro-magnetic ring is operatively connected to an electro-magnetic controller.

11. The integrated photonic circulator of claim 1, wherein the magnetic ring comprises a ring fabricated as a permanent magnet device.

12. An integrated photonic circulator for a chip-scale LiDAR device, comprising:
a micro-ring resonator waveguide, a heating element, first and second bus waveguides, a magneto-optic substrate, a magneto-optic element, and an electro-magnetic ring disposed on a photonic substrate, and a silicon substrate;
wherein the first and second bus waveguides are coupled to the micro-ring resonator waveguide;
wherein the micro-ring resonator waveguide is affixed onto a first side of the photonic substrate of the magnetic ring;
wherein the magneto-optic element and the magneto-optic substrate are arranged on the micro-ring resonator waveguide;
wherein the electro-magnetic ring is affixed to the magneto-optic substrate;
wherein the heating element is affixed to the photonic substrate on a second side of the photonic substrate that is opposite to the first side of the photonic substrate;
wherein the photonic substrate is affixed to the silicon substrate; and
wherein the electro-magnetic ring is concentric with the micro-ring resonator.

13. A light detection and ranging (LiDAR) device, comprising:
a laser, a transmit optical splitter, a photonic circulator, a photodetector, and an optical phased array;
wherein the laser, the transmit optical splitter, the photonic circulator, the photodetector, and the optical phased array are arranged as a chip-scale package on a single semiconductor device;
wherein the laser generates a first light beam that is transmitted to an aperture of the optical phased array via the transmit optical splitter, the photonic circulator, and the optical phased array;
wherein the first light beam is transmitted to the photodetector via the transmit optical splitter;
wherein the aperture of the optical phased array captures a second light beam that is transmitted to the photodetector via the optical phased array and the photonic circulator; and
wherein the photonic circulator includes:
a micro-ring resonator waveguide, a heating element, first and second bus waveguides, a magneto-optic substrate, a magneto-optic element, and an electro-magnetic ring disposed on a photonic substrate, and a silicon substrate.

14. The LiDAR device of claim 13:
wherein the first and second bus waveguides are coupled to the micro-ring resonator waveguide,
wherein the micro-ring resonator waveguide is affixed onto a first side of the photonic substrate,
wherein the magneto-optic element and the magneto-optic substrate are arranged on the micro-ring resonator waveguide,
wherein the electro-magnetic ring is affixed to the magneto-optic substrate,
wherein the heating element is affixed to the photonic substrate,
wherein the photonic substrate is affixed to the silicon substrate, and
wherein the electro-magnetic ring is concentric with the micro-ring resonator.

15. The LiDAR device of claim 13, wherein the heating element being affixed to the photonic substrate comprises the heating element being affixed to a second side of the photonic substrate that is opposite to the first side of the photonic substrate.

16. The LiDAR device of claim 13, wherein the heating element being affixed to the second side of the photonic substrate that is opposite to the first side of the photonic substrate comprises the heating element being deposited in a trench that is formed in the second side of the photonic substrate.

17. The LiDAR device of claim 13, wherein the electro-magnetic ring is operatively connected to an electro-magnetic controller, and wherein the heating element is operatively connected to a heating controller.

18. The LiDAR device of claim 13, wherein the magneto-optic element and the magneto-optic substrate being arranged on the micro-ring resonator waveguide comprises the magneto-optic element being affixed to the micro-ring resonator waveguide, and the magneto-optic substrate being affixed to the magneto-optic element.

19. The LiDAR device of claim 13, wherein the magneto-optic element and the magneto-optic substrate are fabricated from a magneto-optical garnet composed as $(CeY)_3Fe_5O_{12}$.

* * * * *